United States Patent Office 3,649,572
Patented Mar. 14, 1972

3,649,572
EPOXY FOAMS
Thomas J. Hairston, College Station, and Wayne E. Presley and Stephen P. Edwards, Lake Jackson, Tex., assignors to The Dow Chemical Company, Midland, Mich.
No Drawing. Filed Apr. 28, 1969, Ser. No. 820,710
Int. Cl. C08g 53/10
U.S. Cl. 260—2.5 EP         13 Claims

ABSTRACT OF THE DISCLOSURE

This invention relates to epoxy resin foams having good physical properties and being free of scorching in thicknesses up to at least two inches. Such foams are prepared by curing an epoxy resin with an amine in the presence of a phenolic promoter while expanding with a volatile agent wherein the composition has a $W_s$ value of not less than about 270, and an $M_b$ value of not greater than about 320. When the phenolic promoter is 2.5 functional or higher and is used to replace part of the amine curing agent under the conditions defined herein, the limit of $M_b$ is increased to a maximum of 380 as the proportion of phenolic promoter is increased. The $W_s$ limit, however, remains at 270.

BACKGROUND OF THE INVENTION

Field of the invention

Polymer foams, including those of the present invention, are usable in applications as diverse as thermal insulation, packaging materials, core material for laminated structures and the like.

Epoxy polymers are prepared by the irreversible curing of a polyepoxide in reaction with a curing agent.

Attempts to prepare satisfactory epoxy resin foams from polyepoxides have, in the past, failed for various reasons, such as that insufficient expansion or "blowing" of the polymer under the influence of the blowing agent occurred before the polymer became sufficiently rigid to resist further blowing; or curing and hardening have taken place slowly enough or under conditions adverse enough that the foam has collapsed before becoming self-supporting; and when either or both of these problems has been overcome there has frequently been the problem that heat of reaction resulting from the curing of the polyepoxide has discolored and scorched the resulting foam, weakening it and rendering it unsuited for many uses. The present invention is concerned with the preparation of an epoxy resin foam having good physical properties, and an absence of scorching in thicknesses up to about at least 2 inches.

Prior art

U.S. Pat. 3,051,665 teaches the preparation of an epoxy resin foam wherein the polyepoxide is cured with boron trifluoride. This reference mentions the density of the resulting product but does not appear to speak well of the physical properties of the product such as compressive strength.

Desirably, a rigid epoxy resin foam should be resistant to heat distortion and should have good dimensional stability. The foam should not be sensitive to air or to temperature changes or to moisture and it should be cured uniformly, both in the interior depths and on the surface. Moreover, it should be possible to cure masses of up to several pounds of such foam in a single batch in order to produce foamed articles of useful size and dimension. It is not believed that the prior art provides means for achieving these advantages.

A liquid polyepoxide has been mixed with a liquid amine to obtain a curable liquid epoxy composition, which has then been foamed in any of various ways and cured; but heat of reaction from such foams has resulted in partial decomposition, scorching, discoloration, and resultant weakening. See Rigid Plastic Foams (Reinhold Publishing Company, New York, 1963) by Ferrigno, page 214 et passim.

DESCRIPTION OF THE PRESENT INVENTION

The present invention provides cured epoxy resin foams in which, in larger masses than have heretofore been possible to prepare, heat damage from heat of reaction does not injure the resulting foam. The resulting foam has good dimensional stability toward heat and humidity, good thermal insulating properties, good mechanical strength, and is substantially free of autogenous charring.

The foams of the present invention are prepared from a polyepoxide, preferably of the general type represented by the formula

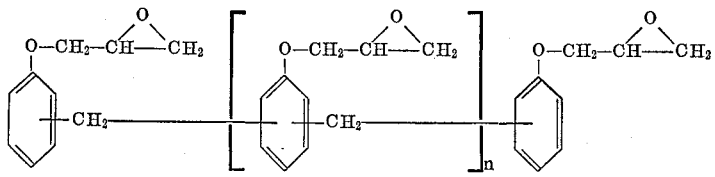

wherein $n$ is of an average value between about 0.5 and about 4, in admixture with a blowing agent, which is typically a volatile solvent liquid, a foam cell regulator, an amine-type hardener, and a phenolic promoter. Foaming and curing is usually accomplished by combining the polyepoxide-blowing agent-cell regulator mixture and the hardener-phenolic promoter mixture at an initial reaction temperature, said initial reaction temperature being that at which the blowing agent has a low vapor pressure so as to minimize loss of blowing agent prior to start of the polymerization.

Optionally, the foaming and curing may be accomplished by combining the polyepoxide-blowing agent-cell regulator mixture and hardener-phenolic promoter mixture under pressure such that the resultant mixture when passed through a "let down" valve results in a frothed mixture which is capable of further expansion. The pressure employed is that required to sufficiently overcome the vapor pressure of the resultant mixture as it passes into the "let down valve" so as to regulate the flow through the said "let down valve."

The let down valve above can, for example, be of the annular type where nitrogen pressure is maintained between the outer metal jacket and three moving inner surfaces consisting of plies of butyl rubber and fabric oriented on the bias for stretching and constriction of the opening, or the let down valve can be of a rotating shaft type where constriction depends upon the amount of opening area on the rotating shaft. The latter is described in U.S. 3,419,934.

The mixing and combining of the reactants can be carried out at temperatures over almost the entire range at which water is liquid. Below about 10° C., the resulting mixtures are so heavily viscous as to inhibit foam formation; about 125° C., the viscosity tends to be so low and the vapor pressure of the blowing agent so high that the preparation of satisfactory foams requires pressure equipment and special manipulation and, because regarded as unnecessary, undesirable. The preferred temperature range is approximately 20° to 60° C., prior to release of heat of reaction.

It is essential to the present invention that the total foamable resin composition (including polyepoxide, hardener, phenolic promoter, cell regulator, blowing agent, reactive diluent and the like) has a $W_s$ value at or above 270. The expression $W_s$ represents the total weight of the above-defined mixture per reactive site on the basis of 1 epoxide equivalent, i.e., the total weight of the components of the foam per epoxide equivalent contained therein. Thus, a highly reactive or exothermic polyepoxide foam composition tends to have a low $W_s$ and a polyepoxide foam composition of intermediate to low reactivity or exotherm tends to have a higher $W_s$.

When a curable mixture is employed having a $W_s$ significantly lower than about 270, scorching occurs from heat of reaction as curing reaction occurs within the resulting foam.

It is also essential to the present invention that the hardenable polyepoxide mixture to be employed have a potential theoretical density of crosslinkages between molecules, which is within certain limits as set forth and hereinafter called $M_b$. The empirical expression $M_b$ represents the appropriate weight of reactive components per theoretical branch point. The upper limit for the theoretical value of $M_b$ is normally 320. Under certain specific conditions the upper limit of $M_b$ is raised progressively to 380. The values set forth as necessary in the present invention represent relatively abundant crosslinkages, which is necessary if the foam is to have good dimensional stability and compressive strength and to retain these properties.

The value $M_b$ is readily calculated. First, the weights of the reactive components, i.e. the polyepoxide, the amine curing agent, and other reactive components which enter into the polymer molecule are added together. The resulting weight is then divided by a figure which is achieved by dividing the weight of each contributing component by its molecular weight, and multiplying the value thus attained by the functionality of the component minus two, and adding together the values thus achieved. This is represented by the formula:

$$M_b = \frac{\text{total weights of reactive components, i.e. } A+B+\text{etc.}}{\frac{\text{weight of } A}{\text{mol. wt. of } A}(\text{functionality } A-2)+\frac{\text{weight of } B}{\text{mol. wt. of } B}(f_B-2)+\text{etc.}}$$

It is not intended that the theoretical $M_b$ described herein should be consistent with the classical $M_c$ or molecular weight per branch point such as that taught by Bolin et al. in an article entitled "Properties of Urethane Foam Related to Molecular Structure," which appeared in vol. 4, No. 3, July 1959, Journal of Chemical and Engineering Data. There are two principal reasons for the departure. In the first case the reaction is considered to occur in two stages. In stage A, amine active hydrogen reacts with an epoxide group under the influence of the phenolic promoter. The temperature of the mass rises due to the exothermic reaction. At a temperature in the range of 80°–110° C., reaction stage B commences wherein terminal epoxide groups of the prepolymer react with the phenolic compound to give the final polyhydroxy ether. The second reason for the departure from the classical $M_c$ arises from the generally accepted concept that the actual crosslink density attained is significantly below the theoretical. Thus, if $M_b^*$ is the actual molecular weight per branch point, this value is higher than $M_b$ or $M_c$, which are both calculated values. In reality, the dimensional stability of the structure is dependent upon the $M_b^*$, and the $M_b$ (calculated) is a guide used to optimize the $M_b^*$ and the dimensional stability. Since excessive heat of reaction can weaken the expanded polymer, the lower limit on $W_s$ is also a guide toward achieving a desired dimensional stability.

For delineation of the concept of $M_b$ as described herein, the following guides are included:

TABLE I.—SOURCE OF REACTIVE HYDROGEN

| | Equivalents of active hydrogen |
|---|---|
| Total active hydrogen | 0.95 to 1.10. |
| Active hydrogen derived from amine NH or $NH_2$ | 1.05 to 0.70. |
| Active hydrogen derived from phenolic OH | 0.05 to 0.40. |

TABLE II.—M: VERSUS FUNCTIONALITY OF THE PHENOLIC PROMOTER AND EQUIVALENTS OF AMINE

| Formulation type | Equiv. of amine NH | Functionality of phenol in promoter | $M_b$ |
|---|---|---|---|
| I | 0.95 to 1.05 | 1 to 6.0 | 320 |
| II | 0.95–0.70 | 2.5 to 6.0 | 320–380 |

In Formulation Type I of Table II, only the amine equivalents are used in the calculation of an empirical $M_b$, which is illustrated by the calculations of $M_b$ following Examples 1–4. In Formulation Type II, both amine and phenol are used for $M_b$ as shown in Example 5.

The total quantity of amine curing agent and phenolic promoter should be such as to provide from about .95 to about 1.10 active hydrogen equivalents per epoxide equivalent.

Table I and Table II show that when the active hydrogen equivalents contributed by the amine curing agent is from about 0.95 to about 1.05 equivalents per epoxide equivalent, the calculated $M_b$ value should not exceed about 320. The tables also show that when the active hydrogen equivalent contributed by the amine decreases from about 0.95 to about 0.70 equivalent per epoxide equivalent and the functionality of the phenolic promoter is from about 2.5 to about 6, the calculated value of $M_b$ progresses from about 320 to about 380. That is to say, that if .70 active hydrogen equivalent is contributed by the amine, and the remaining .25 to .40 active hydrogen equivalent is provided by a 2.5 to 6 functional phenolic promoter, then the calculated $M_b$ value would have to exceed about 380 before the resultant foam would be unsuitable, provided the calculated $W_s$ value was not lower than about 270. Therefore, when a phenolic promoter having a functionality of 2.5 or more is used to replace part of the amine curing agent, the limit of $M_b$ is increased to a maximum of 380 as the proportion of phenolic promoter is increased.

Suitable curing agents which may be employed herein include, for example, the polyalkylene polyamines such as diethylene triamine, triethylene tetramine and the like, composite curing agents include for example the adducts of an aromatic isocyanate such as, for example, phenyl isocyanate with an alkylene polyamine or polyalkylene polyamine such as ethylene diamine, propylene diamine, tetramethylene diamine, hexamethylene diamine, diethylene triamine, triethylene tetramine and the like which are more fully described in U.S. Pat. No. 3,407,175.

Other suitable composite curing agents which may be employed herein are the reaction products of aryl glycidyl ethers such as, for example phenyl glycidyl ether, cresyl glycidyl ether and the like and polyglycidyl ethers of polyhydric aromatic compounds such as for example, the various polyglycidyl ethers of bisphenols, cresol, hydroquinone, resorcinal and the like with alkylene polyamines and polyalkylenepolyamines and the like including, for example, ethylene diamine, propylenediamine, hexamethylene diamine, propylenediamine, hexamethylene diamine, tetramethylenediamine, diethylenetriamine, tetraethylenediamine and the like.

Still other suitable composite curing agents which may be employed are the reaction products of a bisphenol with formaldehyde and ammonia or a primary alkylamine of 1–4 carbon atoms or an alkenyl amine of 3 to 4 carbon atoms. These curing agents are more fully described in U.S. Pat. No. 3,400,154.

Mixtures of any of the above mentioned curing agents may be employed to produce the epoxy resin foams of the present invention.

It is usually preferred to employ curing agents which are the composite curing agents prepared from the equimolar reaction of an aromatic isocyanate with a polyalkylene polyamine and the reaction product of an epoxide, such as, for example, styrene oxide, an aryl glycidyl ether or a polyglycidyl ether of a bisphenol or polyhydric phenol, with a polyalkylene polyamine.

Suitable phenolic promoters are phenol, diphenols such as, for example, p,p'-isopropylidine diphenol, p,p'-methylene diphenol, hydroquinone, resorcinol and the like, halogenated phenols such as, for example, chlorophenol, dichlorophenol and the like, novolac resins such as are produced by the acid catalyzed reaction products of phenol and an aldehyde such as, for example, formaldehyde wherein the functionality of the resultant novolac resin is from about 2 to about 6.

If the phenolic compound has a functionality of one, it is essentially a promoter. The amine hardener must provide at least 0.95 equivalent of active hydrogen per equivalent of epoxide. On the other hand, with 0.7 equivalent of amine active hydrogen and 0.3 equivalent of phenolic compound, the latter must have a functionality of at least 2.5 and yet be high enough to satisfy the conditions of $M_b$ and mix viscosity. With regard to the allowable upper limit for $M_b$ (Table II), when the equivalents of amine hydrogen are decreased from 0.95 to 0.70 it is permissible to increase $M_b$ progressively from 320 to 380. Likely this is due to the increased promotion of the first stage reaction of amine and epoxy compounds and also to the increase in aromaticity in the final molecule, although such explanation should not be binding.

The nonionic materials are preferred, as the cell regulator component of the foam composition, as having a strong tendency to form foams, but good results are obtained from the use of mixtures of anionic and nonionic or of cationic and nonionic surfactants.

Suitable cell regulators include, for example, the nonionic surfactants such as the polyoxyalkylene derivatives of an alkyl phenol and the like, the anionic surfactants such as the alkali metal salts of organic sulfonic acids e.g. Benax 2A1, Triton X–200 and the like, and the cationic surfactants such as the organic ammonium halides, e.g. Triton K–60 and the like.

The cell regulator is employed in cell regulating quantities which may be in the range of from about 0.3 to about 3 percent and preferably from about 0.5 to about 2 percent by weight of the total formulation. The upper limit of 3 percent is not on the ability of the regulator to control the cell size, but rather on the fact that the resultant foams in some instances will tend to possess decreased strength properties.

Suitable blowing agents which may be employed herein are vaporizable or volatile organic fluids which include, for example, lower molecular weight alkanes, alkenes and halogen-substituted lower molceular weight alkanes boiling below about 100° C. at atmospheric pressure. Suitable volatile organic compounds include, for example, the pentanes, butanes, hexanes, hexenes, pentenes, heptanes, 2,2,4-trimethylpentane, ethyl chloride, methylene chloride, dichlorodifluoromethane, trichlorofluoromethane, dichlorofluoromethane, 1,1,2 - trichlorotrifluoroethane, 1,1-dichlorotetrafluoroethane and the like.

The quantity of blowing agent is dependent upon the foam density desired and the molecular weight of the blowing agent. Usually, from about 10 to about 22 percent by weight of the total foam mixture is employed and from about 15 to about 18 percent by weight of the total foam mixture is preferred for optimum of insulation value, strength and dimensional stability.

The viscosity of the complete curable polyepoxide mixture prior to curing is an important factor. If of too low viscosity, the resin loses inclusions of blowing agent which burst through its surface and are lost, with resulting collapse of the foam. If too viscous, the resin is difficult to mix with the necessary intimacy to obtain a homogeneous foam. Good results are obtained, although not necessarily all results are exactly alike as to foam cell size and the like, by the employment of curable mixtures of an uncured viscosity of from 20,000 to 100,000 centipoises. For an all-purpose epoxy foam of uniform, relatively small cell size, adapted to most applications, a viscosity of from about 30,000 to about 50,000 centipoises is preferred. It is particularly desirable to employ a curable polyepoxide mixture of a viscosity of about 38,000–42,000 centipoises. The curable polyepoxide mixture of which the viscosity is taken is, of course, the viscosity at the foaming temperatures of the uncured mixture containing polyepoxide, amine curing agent, cell regulator, blowing agent and phenolic promoter, as well as any other ingredients, if employed. The viscosity of the foamable components, if too high, may be reduced by the addition of liquid reactive diluents such as butyl glycidyl ether, phenyl glycidyl ether and the like, by the addition of liquid phosphorus containing fire retardant agents such as tris(2-chloroethyl)phosphate, phenolic promoters having a low viscosity such as, for example, phenol, chlorophenol, dichlorophenol and the like. If too low, the viscosity may be controlled by the employment of a larger quantity of the more viscous phenolic promoters such as the novolac resins. However, it should be noted that the controlling factors in the preparation of the epoxy foams of this invention are the $W_b$ and $M_s$ values and as such the compounds added to the composition should not cause the $W_s$ value to fall below about 270 and the $M_b$ value to exceed about 320 or about 380 as the case may be.

When the foregoing necessary conditions are met, a foam with useful properties is produced. However, foams having much preferable properties are obtained when the polyepoxide has a high aromatic content. The highly aromatic epoxy foams cool, after heat curing, with little or no shrinking. The highly aromatic epoxy foams are also resistant to solvents and give the foams good characteristics of dimensional stability. The polyglycidyl ethers, such as the diglycidyl ethers of the bisphenols are adapted to be employed in the present invention, and, as the conditions, foregoing, are met, such polyepoxides yield good epoxy foams. However, foams of preferable properties as to dimensional stability, crush resistance, and the like are obtained when employing, as the polyepoxide, an epoxy novolac as hereinbefore shown by general formula. Epoxy novolacs of various characteristics are employed with good results.

In preparing foams of desirable finished properties it is much preferred to employ starting materials which, without the addition of non-functional additives to alter physical properties, have the physical properties desired. Thus, British Patent 919,779 discusses the employment of finely divided solids to attain thixotropy. The resulting property, though treated as viscosity, is not necessarily the same as the viscosity attained by first partially polymerizing or otherwise reacting the polyepoxide precursors to attain a desired viscosity. The employment of such additives for viscosity control and the like is contraindicated when it is desired to obtain a foam of optimum properties. In contrast, when important properties are achieved by the inherent natures of the employed substances, such additives as metal flakes, coloring agents, agents to diminish flammability and the like are added to suit the convenience of users of the foam. This is not to be confused with the reactive liquid diluents which can be employed as viscosity control agents mentioned on page 12 of this specification in that the use of insoluble solid additives in a foam formulation will cause a rapid reduction in strength, particularly resistance to penetration, i.e. as the quantity of solids is increased, the strength, particularly the resistance to penetration, rapidly decreases.

In one aspect, then, the present invention is embodied in a composition comprising essentially epoxy resin, a surfactant cell-size control agent (cell regulator), a vaporizable liquid blowing agent, an amine curing agent for the epoxy resin, and a phenolic promoter, said composition having a $W_s$ value of not less than about 270, and having also an $M_b$ value within the limits as described herein, said composition adapted to be employed to produce a firm cured epoxy resin foam of good bulk density, good resistance to aging, of good thermal insulating properties, good mechanical strength, and substantially free of autogenous scorching.

In a narrower sense, a preferred form of the invention is embodied in a composition of the sort described in which the epoxy resin is an epoxy novolac, the amine curing agent is the reaction product of a polyalkylene polyamine and at least one amine reactive compound which is an epoxide such as, for example, phenyl glycidyl ether, styrene oxide, or the dehydrohalogenated reaction product of a bisphenol and an epihalohydrin, or is an aromatic isocyanate such as, for example, phenyl isocyanate and the phenolic promoter is a novolac resin.

A particularly advantageous embodiment of the invention is a composition as described in which the amine curing agent is a reaction product of approximately equimolecular amount of styrene oxide and diethylene triamine, the blowing agent is trichlorofluoromethane, and the cell regulator is a nonionic surface active agent that is a polyalkylene oxide derivative of an alkylphenol and the promoter is a 3.5 functional novolac resin.

Practice of the invention leads to a cured epoxy resin foam characterized by good thermal insulation properties, low bulk density, good resistance to aging, good mechanical strength, substantial absence of autogenous scorching; said foam being produced by mostly autogenous curing of a curable, foamable polyepoxide resin mixture comprising essentially a polyepoxide resin, surfactant cell regulator, amine curing agent for a polyepoxide and a foam-producing amount of a vaporizable liquid blowing agent, said mixture being of a $W_s$ value of not less than about 270, a $M_b$ value not greater than about 320 or in certain cases, as explained herein, about 380.

A stronger product is obtained as a foam as described in which the polyepoxide is an epoxy novolac.

In another sense, the invention is in a method of producing a cured epoxy resin foam, the product foam being characterized by good thermal insulation properties, good resistance to aging, low bulk density, good mechanical strength, and substantial absence of autogenous scorching; the said method comprises the steps of preparing a first mixture comprising essentially a polyepoxide resin, a surfactant cell regulator and a vaporizable liquid blowing agent; and of preparing a second mixture comprising essentially an amine curing agent for polyepoxide resin together with a phenolic promoter and thereafter combining and mixing said first and said second mixtures to obtain a foamable mixture characterized by a $W_s$ value of not less than about 270, a $M_s$ value as described.

While such mixture is readily prepared ahead of time and held under pressure or under refrigeration until wanted, the actual production of a foam embraces the described method which comprises the steps of the method as described, followed by the step of disposing the resulting foamable mixture in a mold at from about 20 to about 100° C., permitting the resulting foam to remain in said mold until at least sufficient autogenous cure has taken place that the said foam can be removed from said mold without significant deformation, and submitting the foam to a time or temperature of cure dependent primarily upon the equivalents of amine component and the $W_s$ value of the composition.

With $W_s$ values close to the minimum of 270, little or no external heating is required for cure. With higher $W_s$ values and/or a low ratio of $$\frac{\text{amine equivalents}}{\text{Novolac equivalents}}$$

external heating may be required up to about two hours at 75° C.

Example 1

A foamable, curable, pourable polyepoxide resin mixture was prepared by adding, heating and mixing together in a closed, pressure-tight vessel equipped with dispensing means (all parts by weight) 180 parts (approximately 1 epoxy equivalent) of an epoxy novolac having an average of approximately 3.5 aromatic nuclei bonded together sequentially through predominantly o and p methylene groups as novolac "backbone," approximately each aromatic nucleus having one glycidyl ether group, and having a viscosity of approximately one million centipoises at approximately room temperature (commercially designated as "D.E.N. 438"), five parts of a nonionic surfactant cell-size control agent, of which tris(polyoxyethylene) sorbitan monooleate (commercially designated as "Tween 80") is representative and was here employed, together with 50 parts of trichlorofluoromethane. This mixture was held aside, under pressure, and allowed to cool, as a second mixture was prepared consisting of 58.3 parts (approximately 1.04 active hydrogen equivalents) of the reaction product of equimolecular amounts of styrene oxide (SO) and diethylenetriamine (DETA) together with 11.7 parts (approximately .11 active hydrogen equivalents) of a 3.5 functional novolac.

The two mixtures were then blended and quickly dispensed into a cavity of which the internal dimensions are two inches by twelve inches by twelve inches and, as the trichlorofluoromethane blowing agent vaporizes, to expand as a fluid, viscous foam which occupied the entire interior space of the cavity. Exothermic reaction began promptly throughout the entire foamed mass, with resulting relatively uniform rise of temperature, sufficient to effect cure of the resulting foam. The foam was permitted to stand until further evolution of heat had ceased and the foam had substantially cooled. Thereupon it was removed from the mold cavity and examined for properties.

The foam of the present example was found to have a density of 2.16 lbs./cu. ft., to have 87 percent non-interconnected cells, to withstand pressures up to 18 pounds per square inch before showing compression yield; to withstand humidity aging well, and to manifest a very low moisture vapor transmission.

Example 2

The present example was conducted employing the same starting materials in the same proportions and prepared as the two separate starting mixtures in exactly the manner described for Example 1. The two separate starting mixtures were at temperatures such that when mixed the resultant froth was at a temp. of 45° C. As the two separate starting mixtures were combined to obtain a foamable mixture, the mixture was blended under 40-60 p.s.i. nitrogen pressure so that passage through the "let-down" valve produced mechanical expansion or frothing and resulted in a reduction in the density of the final rigid foam. Upon the completion of the mixing and pressure let-down operation, the resulting frothed mixture was disposed in a mold as described in Example 1, and allowed to cure.

Upon completion of the cure and partial cooling of the resulting foam, it was removed from the form and examined for properties and found to have a density of 2.43 lbs./cu. ft., to have 90.1 percent of all cells non-interconnected, to withstand 32 pounds per square inch pressure prior to manifesting compression yield, to have excellent properties to withstand humidity aging and very low moisture vapor transmission.

Calculation of the $M_b$ and $W_s$ values for Examples 1 and 2 are identical since the only difference was in the method of preparation. These calculations are as follows.

$M_b$ (Examples 1 and 2):

$$M_b = \frac{\text{wt. of DEN 438} + \text{wt. of SO/DETA adduct}}{\frac{\text{wt. of DEN 438}}{\text{mol. wt. of DEN 438}}(\text{funct.}-2) + \frac{\text{wt. of SO/DETA adduct}}{\text{mol. wt. of SO/DETA adduct}}(\text{funct. SO/DETA adduct}-2)}$$

$$M_b = \frac{180 + 58.3}{\frac{180}{630}(3.5-2) + \frac{58.3}{224.4}(4-2)}$$

$$M_b = \frac{238.3}{\frac{180}{630}(1.5) + \frac{58.3}{224.4}(2)} = \frac{238.3}{.428 + .519}$$

$M_b = 252$ $W_s$ = sum of the weights of all the foam components based on one epoxide equivalent.

$W_s = 180 + 5 + 50 + 58.3 + 11.7$
$W_s = 305$

Example 3 (Comparative example wherein the value of $M_b$ is above 320)

The following components were blended at room temperature (about 25° C.) by means of an electric drill driven propeller and shaft type stirring means and poured into a 12" x 12" x 2" box mold and allowed to foam.

190 parts by wt. (1 epoxy equivalent) of a diglycidyl ether of p,p'-isopropylidene diphenol sold commercially by The Dow Chemical Co. as DER 331.
58.3 parts by wt. (1.04 active hydrogen equiv.) of the reaction product of styrene oxide (SO) with diethylene triamine (DETA) in a molar ratio of 1:1.
11.7 parts by wt. (.11 active hydrogen equiv.) of a 3.5 functional novolac resin.
5.2 parts by wt. Tween 60.
52.0 parts by wt. of $CFCl_3$.

The resultant foam shrank in the box mold and had an irregular surface and was therefore unsatisfactory.

$$M_b = \frac{\text{wt. of DER 331} + \text{wt. of SO/DETA adduct}}{\frac{\text{wt. DER 331}}{\text{mol. wt. DER 331}}(\text{funct. DER 331}-2) + \frac{\text{wt. SO/DETA adduct}}{\text{mol. wt. of SO/DETA adduct}}(\text{funct. SO/DETA adduct}-2)}$$

$$M_b = \frac{190 + 58.3}{\frac{190}{380}(2-2) + \frac{58.3}{224.4}(4-2)} = \frac{247.3}{0 + .519} = \frac{247.3}{.519}$$

$M_b = 476$ $W_s$ = sum of the weights of all the foam components based on one epoxide equivalent.
$W_s = 190 + 58.3 + 11.7 + 5.2 + 52$
$W_s = 317.2$ Example 4 (Comparative example wherein $W_s$= is below 270)

The following components were blended at room temperature (25° C.) and foamed by the procedure given in Example 3.

180 parts by weight (1 epoxy equiv.) of DEN 438.
20.6 parts by weight (1 active hydrogen equiv.) of diethylene-triamine (DETA).
4.1 parts by weight of a 3.5 functional novolac resin.
4.0 parts by weight Tween 60.
40.1 parts by weight $CFCl_3$.

The resultant foam had large cells, was friable and dark in color due to exothermic overheating and was therefore unsatisfactory.

$$M_b = \frac{\text{wt. of DEN 438} + \text{wt. DETA}}{\frac{\text{wt. of DEN 438}}{\text{mol. wt. DEN 438}}(\text{funct. DEN 438}-2) + \frac{\text{wt. of DETA}}{\text{mol. wt. DETA}}(\text{funct. DETA}-2)}$$

$$M_b = \frac{180 + 20.6}{\frac{180}{630}(3.5-2) + \frac{20.6}{103}(5-2)} = \frac{200.6}{\frac{180}{630}(1.5) + \frac{20.6}{103}(3)}$$

$$M_b = \frac{200.6}{.428 + .6} = \frac{200.6}{1.028}$$

$M_b = 195.1$ $W_s$ = sum of all the foam components per epoxide equivalent.
$W_s = 180 + 20.6 + 4 + 40.1 + 4.1$
$W_s = 248.8$ Example 5

The following components were blended and foamed by the procedure given in Example 1.

180 parts by weight (1 epoxy equiv.) DEN 438.
16 parts by weight (0.778 active hydrogen equiv.) diethylenetriamine (DETA).
24 parts by wt. (0.228 active hydrogen equiv.) 3.5 funct. novolac resin.
5 parts by wt. Tween 80.
50 parts by wt. $CFCl_3$.

The resultant foam after heat curing two hours at 75° C. had a density of 2.04#/ft.³, a compressive yield strength of 31 p.s.i. and a humidity aging value (dimensional stability) of 13% volume increase after 28 days at 140° F. and 98–100% relative humidity.

$$M_b = \frac{\text{wt. of DEN 438} + \text{wt. of DETA (0.776 active hydrogen eq.)} + \text{wt. of 3.5 f. novolac resin (0.224 active hydrogen eq.)}}{\frac{\text{wt. of DEN 438}}{\text{m.w. of DEN 438}}(\text{funct.}-2) + \frac{\text{wt. of DETA}}{\text{m.w. of DETA}}(\text{funct.}-2) + \frac{\text{wt. 3.5 funct. novolac}}{\text{m.w. of 3.5 f. novolac}}(\text{func.}-2)}$$

$$M_b = \frac{180 + 16 + 23.5}{\frac{180}{630}(3.5-2) + \frac{16}{103}(5-2) + \frac{23.5}{367.5}(3.5-2)}$$

$$M_b = \frac{219.5}{.285(1.5) + .155(3) + .064(1.5)} = \frac{219.5}{.427 + .465 + .096}$$

$$M_b = \frac{219.5}{.988}$$

$M_b = 222$ $W_s$ = sum of all the foam components per epoxide equivalent.
$W_s = 180 + 16 + 24 + 5 + 50$
$W_s = 275$ The epoxy resin foams of Examples 1, 2 and 5, foregoing, show excellent thermal insulation properties, as originally prepared, after humidity aging, and after dry aging; and very low moisture adsorption properties.

We claim:
1. A foamable composition comprising:
(A) a polyepoxide resin selected from the group consisting of diglycidyl ethers of bisphenols and epoxy novolac resins,

(B) a phenolic promoter having a functionality of from about 1 to about 6, (C) a cell regulator, (D) a blowing agent and (E) an amine curing agent for the polyepoxide resin, wherein said amine curing agent is present in a quantity which provides from about .95 to about 1.05 active hydrogen equivalents per epoxide equivalent, the phenolic promoter is present in a quantity which provides from about .05 to about .15 active hydrogen equivalents per epoxide equivalent, the total quantities of components B and E being such that the total quantity of active hydrogen equivalents per epoxide equivalent does not exceed about 1.10, and wherein the calculated $W_s$ value is not less than about 270 and the calculated $M_b$ value is not greater than about 320.

2. The composition of claim 1 wherein the polyepoxide resin is an epoxy novolac and the amine curing agent is the reaction product of a polyalkylene polyamine and at least one compound selected from the group consisting of an aryl glycidyl ether, styrene oxide, a polyglycidyl ether of a polyhydric aromatic compound, and an aromatic isocyanate.

3. The composition of claim 2 wherein the amine curing agent is a reaction product of approximately equimolar quantity of styrene oxide and diethylenetriamine, the blowing agent is trichlorofluoromethane, and the cell regulator is a nonionic surface active agent that is a polyalkylene oxide derivative of an alkyl phenol.

4. The composition of claim 2 wherein the phenolic promoter is a novolac resin having a functionality of about 3.5.

5. A cured epoxy resin foam characterized by good thermal insulation properties, low bulk density, good resistance to ageing, good mechanical strength, a substantial absence of autogenous scorching; said foam produced by the curing and foaming of the compositions of claim 1.

6. A foamable composition comprising:

(A) a polyepoxide resin selected from the group consisting of diglycidyl ethers of bisphenols and epoxy novolac resins, (B) a phenolic promoter having a functionality of from about 2.5 to about 6, (C) a cell regulator, (D) a blowing agent and (E) an amine curing agent for the polyepoxide resin, wherein said amine curing agent is present in a quantity which provides from about .70 to about .95 active hydrogen equivalent per epoxide equivalent, the phenolic promoter is present in a quantity which provides from about .15 to about .40 active hydrogen equivalent per epoxide equivalent, the total quantity of components B and E being present in quantities such that the total active hydrogen equivalents per epoxide equivalent does not exceed 1.10, wherein the calculated $W_s$ value is not less than about 270 and the calculated $M_b$ value does not exceed a value progressing from about 320 to about 380 as the quantity of component E decreases from about .95 active hydrogen equivalent to about .70 active hydrogen equivalent.

7. The composition of claim 6 wherein the polyepoxide resin is an epoxy novolac and the amine curing agent is the reaction product of a polyalkylene polyamine and at least one compound selected from the group consisting of an aryl glycidyl ether, styrene oxide, a polyglycidyl ether of a polyhydric aromatic compound, and an aromatic isocyanate.

8. The composition of claim 7 wherein the amine curing agent is a reaction product of approximately equimolar quantity of styrene oxide and diethylene triamine, the blowing agent is trichlorofluoromethane, and the cell regulator is a nonionic surface active agent that is a polyalkylene oxide derivative of an alkyl phenol.

9. The composition of claim 7 wherein the phenolic promoter is a novolac resin having a functionality of about 3.5.

10. A cured epoxy resin foam characterized by good thermal insulation properties, low bulk density, good resistance to ageing, good mechanical strength, a substantial absence of autogenous scorching; said foam produced by the curing and foaming of the compositions of claim 6.

11. A method of producing a cured epoxy resin foam characterized by good thermal insulation properties, good resistance to ageing, low bulk density, good mechanical strength, and substantial absence of autogenous scorching; which comprises the steps of preparing a first mixture comprising essentially a polyepoxide resin selected from the group consisting of diglycidyl ethers of bisphenols and epoxy novolac resins, a surfactant cell regulator, and a vaporizable liquid blowing agent; and of preparing a second mixture comprising essentially from about .05 to about .15 active hydrogen equivalent per epoxide equivalent of a phenolic promoter and from about .95 to about 1.05 active hydrogen equivalents per epoxide equivalent of an amine curing agent for the polyepoxide resin wherein the combined quantities of phenolic promoter and amine curing agent does not exceed about 1.10 active hydrogen equivalents per epoxide equivalent and thereafter combining and mixing said first and said second mixtures to obtain a foamable mixture characterized by a calculated $W_s$ value of at least about 270, a calculated $M_b$ value not greater than about 380, and a Brookfield viscosity, at the foaming temperature, of from about 20,000 to about 100,000 centipoises.

12. The method which comprises the steps of the method of claim 11 followed by the step of disposing said foamable mixture into a mold at from about 20 to about 100° C. and permitting the resulting foam to remain in said mold until at least sufficient autogenous cure has taken place that the said foam can be removed from said mold without significant deformation.

13. The method of claim 12 wherein the foamable mixture is disposed through a let down valve before being disposed into the mold.

References Cited

UNITED STATES PATENTS

| | | | |
|---|---|---|---|
| 3,282,863 | 11/1966 | Carey et al. | 260—2.5 EP |
| 3,389,094 | 6/1968 | D'Alessandro | 260—2.5 F |

JOHN C. BLEUTGE, Primary Examiner

U.S. Cl. X.R.

260—2 EC, 2.5 F, 47 EC, 831

UNITED STATES PATENT OFFICE
CERTIFICATE OF CORRECTION

PO-1050
(5/69)

Patent No. 3,649,572    Dated 14 March 1972

Inventor(s) Thomas J. Hairston, Wayne E. Presley and Stephen P. Edwards

It is certified that error appears in the above-identified patent and that said Letters Patent are hereby corrected as shown below:

Column 3, line 5, delete "about" and insert --above--.

Column 4, line 18, in the title of Table II, delete "M:" and insert --$M_b$--.

Signed and sealed this 12th day of September 1972.

(SEAL)
Attest:

EDWARD M. FLETCHER, JR.
Attesting Officer

ROBERT GOTTSCHALK
Commissioner of Patents